US006745118B2

(12) United States Patent
Bortolin

(10) Patent No.: US 6,745,118 B2
(45) Date of Patent: Jun. 1, 2004

(54) METHOD TO IMPROVE ENGINE SYNCHRONIZATION PERFORMANCE

(75) Inventor: Dino Bortolin, LaSalle (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 162 days.

(21) Appl. No.: 10/008,910

(22) Filed: Dec. 6, 2001

(65) Prior Publication Data

US 2003/0109981 A1 Jun. 12, 2003

(51) Int. Cl.[7] ................................................ G06F 19/00
(52) U.S. Cl. .................. 701/102; 73/118.1; 123/406.58
(58) Field of Search ....................... 123/406.18, 406.58, 123/185.13, 408.12, 612; 701/102; 73/118.1, 117.3, 117.2

(56) References Cited

U.S. PATENT DOCUMENTS 4,338,813 A 7/1982 Hunninghaus et al. ........ 73/116
5,387,253 A * 2/1995 Remboski et al. ......... 73/117.3
5,447,143 A * 9/1995 Ott et al. .................... 123/612
5,497,748 A * 3/1996 Ott et al. ................. 123/406.6
5,577,475 A 11/1996 De Backer et al. ......... 123/417
5,604,304 A 2/1997 Kokubo et al. ............ 73/117.3
5,736,633 A * 4/1998 Magner et al. ............... 73/116
5,823,166 A * 10/1998 Entenmann et al. ... 123/406.58
5,862,507 A 1/1999 Wu et al. .................. 701/111
6,041,647 A * 3/2000 Matsuoka .................... 73/116
6,202,611 B1 3/2001 Regueiro ................. 123/90.17
6,212,467 B1 4/2001 Guzella et al. ............. 701/103
6,253,145 B1 6/2001 Garrard et al. ............. 701/105
6,278,932 B1 8/2001 Baumel et al. ............. 701/104
6,283,093 B1 9/2001 Lautenschuetz et al. .................... 123/406.33

* cited by examiner

*Primary Examiner*—Henry C. Yuen
*Assistant Examiner*—Johnny H. Hoang
(74) *Attorney, Agent, or Firm*—Ralph E. Smith

(57) ABSTRACT

A method for determining the angular position of an internal combustion engine throughout an engine cycle, the method includes the steps of providing a crankshaft having a plurality of teeth, the crankshaft completing two revolutions per engine cycle. A camshaft is provided having a plurality of teeth, the camshaft completing one revolution per engine cycle. An engine controller is provided. A sample size of the engine cycle is set in each of two concurrent engine cycles. The teeth of the plurality of teeth are counted on the camshaft found in the sample sizes. The crank position is then determined according to the teeth appearing in the sample sizes.

6 Claims, 4 Drawing Sheets

38

| BIT | FUNCTION |
|---|---|
| 50 | ACCUMULATE PERIOD DATA |
| 52 | TRANSFER WORKING REGISTER |
| 54 | ACCUMULATE PERIOD DATA |
| 56 | ACCUMULATE PERIOD DATA |
| 58 | GENERATE PULSE 0.1 DEGREES |
| 60 | GENERATE PULSE 10 DEGREES |
| 62 | PERIOD CAPTURE |
| 64 | INTERRUPT |
| 66 | INTERRUPT |
| 68 | INTERRUPT |
| 70 | INTERRUPT |

METHOD TO IMPROVE ENGINE SYNCHRONIZATION PERFORMANCE

FIELD OF THE INVENTION

The present invention relates generally to engine synchronization, and more particularly to a method of identifying the crankshaft phase from the camshaft location resulting in engine synchronization at a reduced time.

BACKGROUND

Generally in a conventional four stroke engine, an electric engine controller must determine the angular position of the engine by processing signals from sensors on the cam and crank shafts. The four stroke engine cycle repeats every two revolutions of the crankshaft or 720 degrees of crankshaft rotation. The crankshaft signal however, repeats every 360 degrees of crankshaft rotation. The camshaft rotates at half speed of the crankshaft, therefore the camshaft signal repeats every 720 degrees of engine rotation. Information from the camshaft is required to determine which half (or phase) of the 720 degree cycle the crankshaft is in. Normally the crankshaft signal is used to control the engine because of its higher accuracy and the camshaft is used only as a phase reference.

To start the engine quickly, synchronization must be achieved as soon as possible. The crankshaft has reference points every 180 degrees allowing the crankshaft position to be determined around 210 degrees. However the phase is not known based on the crank alone, therefore the engine position can be x or x+360 degrees. The phase cannot be determined until the engine position is determined uniquely from the camshaft signal. The camshaft has fewer teeth to generate a signal from, therefore more engine rotation is needed to achieve synchronization on the camshaft signal. A method is needed to exploit information available from the camshaft signal in order to reduce the overall synchronization time.

SUMMARY OF THE INVENTION

According to a preferred embodiment of the present invention, a method for determining the angular position of an internal combustion engine throughout an engine cycle is provided. The method includes the steps of providing a crankshaft having a plurality of teeth, the crankshaft completing two revolutions per engine cycle. A camshaft is provided having a plurality of teeth, the camshaft completing one revolution per engine cycle. An engine controller is also provided. A sample size of an engine cycle is designated in each of two concurrent engine cycles. The teeth are counted which appear on the camshaft in the sample sizes. The crankshaft position is determined according to the teeth appearing in the sample sizes.

Further areas of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
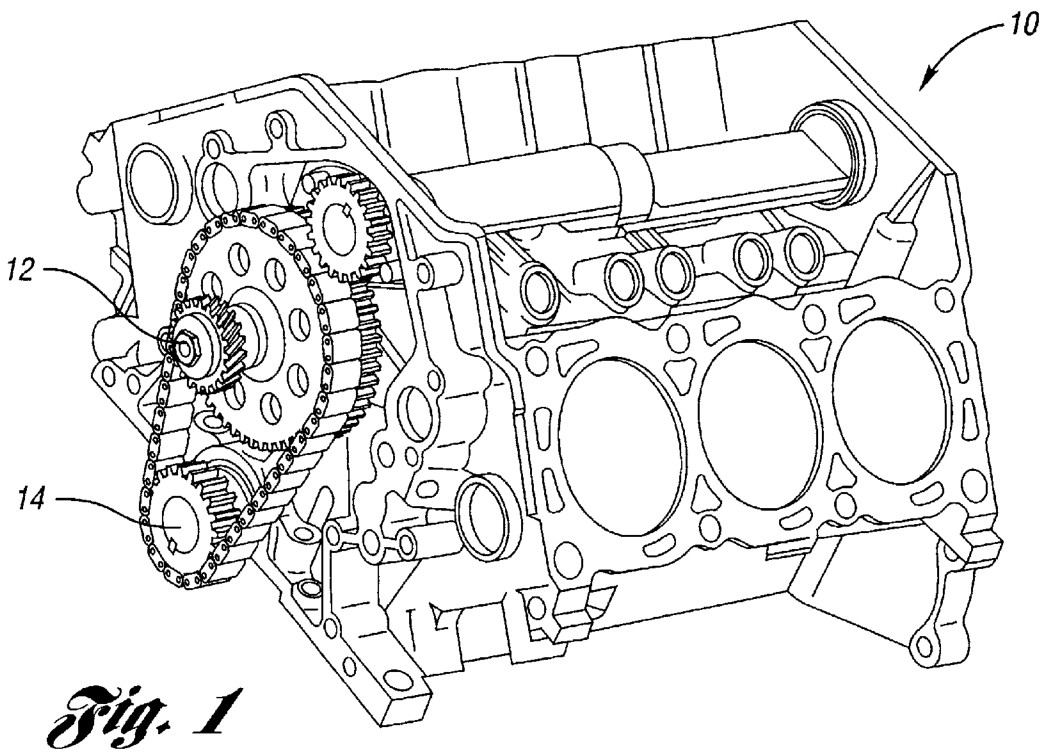
FIG. 1 is a perspective view of an engine block.
Figure 2:
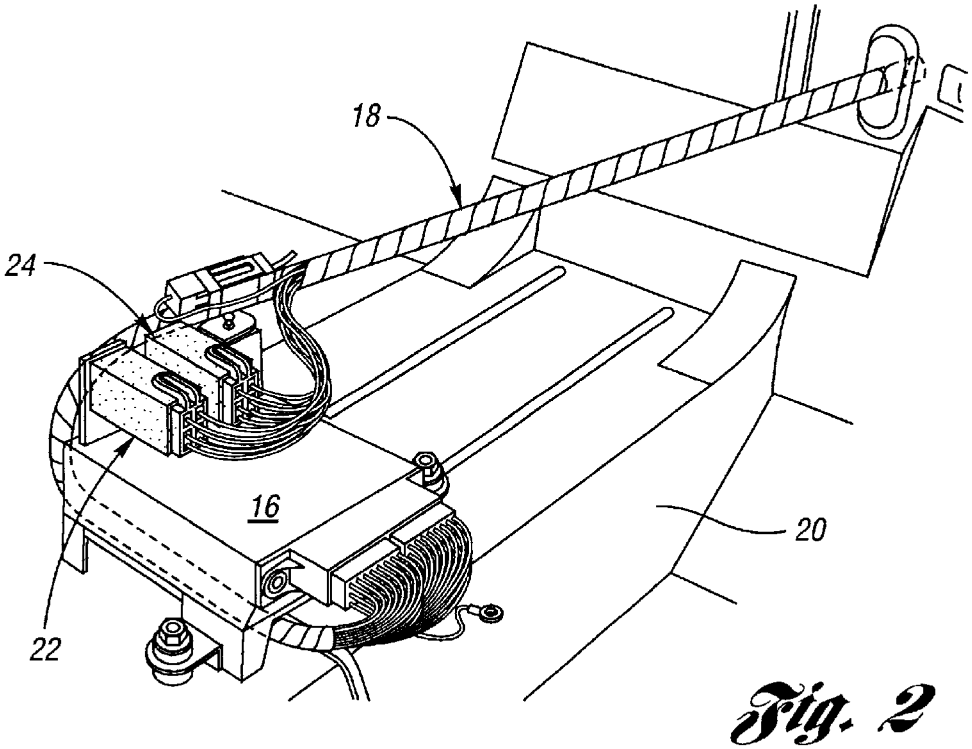
FIG. 2 is a perspective view of an engine control unit incorporating the low resolution processor according to a first embodiment of the present invention.

With initial reference to FIGS. 1 and 2, a camshaft 12 and crankshaft 14 are shown operatively associated with engine block 10. Engine block 10 has been removed from vehicle 20 for illustration. It will be readily appreciated by those skilled in the art that camshaft 12, crankshaft 14 and engine block 10 are merely exemplary and may comprise other variations within the scope of this invention.

Generally in a conventional four stroke engine, an electric engine controller or engine control unit must determine the angular position of the engine 10 by processing signals from sensors (not shown) on the camshaft 12 and crankshaft 14. The four stroke engine cycle repeats every two revolutions of the crankshaft 14 or 720 degrees of crankshaft 14 rotation. The crankshaft signal however, repeats every 360 degrees of crankshaft 14 rotation. The camshaft 12 rotates at half the speed of the crankshaft 14, therefore the camshaft signal repeats every 720 degrees of engine rotation. Information from the camshaft 12 is required to determine which half (or phase) of the 720 degree cycle the crankshaft 14 is in.

Turning now to FIG. 2, an engine control unit (ECU) 16 is shown. Wiring assembly 18 connects the ECU to engine 10. A power relay 22 and fuel pump relay 24 extend from the wiring assembly 18 and attach to the ECU 16. The ECU 16 performs various functions such as timing requirements, fuel concentration, emission control among others. Those skilled in the art will recognize that ECU 16 configuration is merely exemplary and may comprise other configurations which incorporate additional or fewer electrical connectors.

Figures 3, 4:
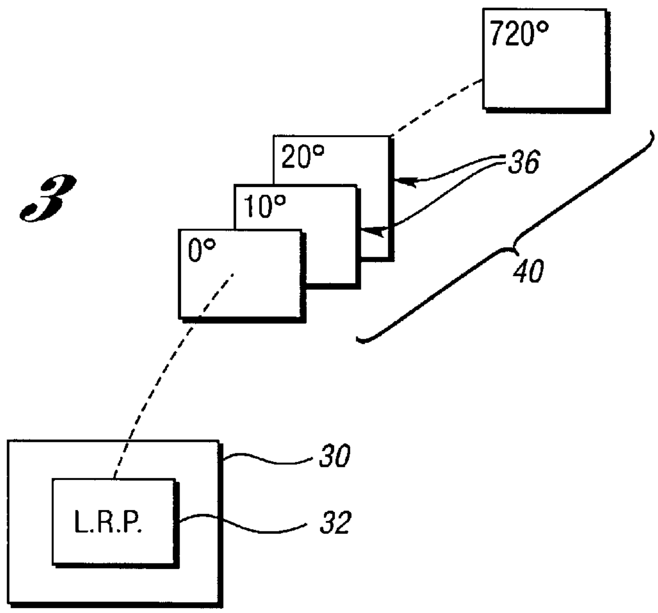
FIG. 3 is a representation of the collection of data groups referred to in the low resolution processor.
FIG. 4 is a representation of a lookup table assigned for each collection of data groups used according to the first embodiment of the present invention.

With continued reference to FIG. 2 and additional reference to FIGS. 3 and 4, ECU 16 incorporates a logic operator 30 having a low resolution processor 32 including a multi-bit lookup table 38 (FIG. 4). Each multi-bit entry in the table 38 corresponds to one specific engine position and defines those operations that are to take place at that point in the engine cycle. The logic operator 30 also contains other circuitry that tracks the engine angular position.

The operation of the engine control using the lookup table 38 will now be described in greater detail. Conventionally, engine position may be extrapolated to a resolution such as 0.1 degrees of crankshaft rotation. According to this invention, the engine position is determined at a lower resolution such as, for example, 10 degrees of crankshaft rotation. According to this example, each 10 degrees of crankshaft rotation comprises a data group 36, the data groups collectively illustrated as data groups 40. It will be appreciated that any resolution which evenly divides into 720 degrees may alternatively be used.

Referencing now FIGS. 1–4, as the crankshaft position reaches 0 degrees, 10 degrees, 20 degrees etc., the logic operator 30 reads the corresponding low resolution processor 32 register from the table 38. In the exemplary 11 bit table 38 shown, each bit represents a specific task to be performed. For each 10 degrees of crankshaft rotation, a table 38 is referenced and the corresponding task is determined from the categories of operations in each bit.

Turning now to FIG. 4, the bits assigned to each table 38 will be described. When the accumulate period data bit 50 is set, the time period over the last ten degrees of crankshaft 14 rotation is accumulated to a working register. When the first zero is read after a string of one or more one's, the working register is transferred to a readable register. A two bit accumulate data field 54, 56 is used to accumulate the time period over the last 10 degrees of engine rotation to one of 3 working registers. When the transfer working register bit 52 is set, the working registers are transferred to a readable register and then cleared. Two generate pulse bits 58, 60 are used to generate a pulse on an external pin (not shown), each producing a pulse of 0.1 degrees or 10 degrees respectively. When the period capture bit 62 is set, the elapsed time between the current and prior time the bit was set is stored. Interrupt bits 64, 66, 68 and 70 generate an interrupt to a microprocessor (not shown) when set. It will be readily understood by those in the art that the order and content of the bits arranged in table 38 is merely exemplary. Likewise, table 38 may also be configured to have a greater or lesser amount of bits.

According to a second aspect of the present invention, a fast lock method employed through the logic operator 30 of the ECU 16 will now be described. Once the crankshaft signal is synchronized or locked, it is not necessary to know the exact position of the engine 10 from the camshaft 12 signal, but only which phase the crankshaft 14 is in. As more edges of the camshaft 12 are read by the logic operator 30, the number of possible engine positions goes down until eventually only one remains and lock is achieved. When there are several possibilities remaining it is possible to determine the engine phase by comparing the few possible camshaft locations with the position of the crankshaft position.

Allowing for build tolerances, chain stretch and other tolerances, the engine position as found independently from the camshaft 12 and crankshaft 14 signals should agree fairly closely. Therefore, when crankshaft 14 lock is reached and the camshaft 12 is still unlocked, the camshaft 12 position should be within the range $y \pm \chi$ or $(y+360) \pm \chi$; where y is the position determined using the crankshaft and $\chi$ is the tolerance. Once the camshaft 12 position has been narrowed down to the point where there is a potential position in one of the ranges but not the other, the crankshaft 14 phase is then known even though the camshaft 12 position has not been determined yet. The logic operator 30 waits until there are 3 or less possible marked camshaft 12 locations. If exactly one of the marked locations falls within the ranges described above, then the crankshaft 14 phase is known and the camshaft 12 is simultaneously locked using the fast lock method.

Figure 5:
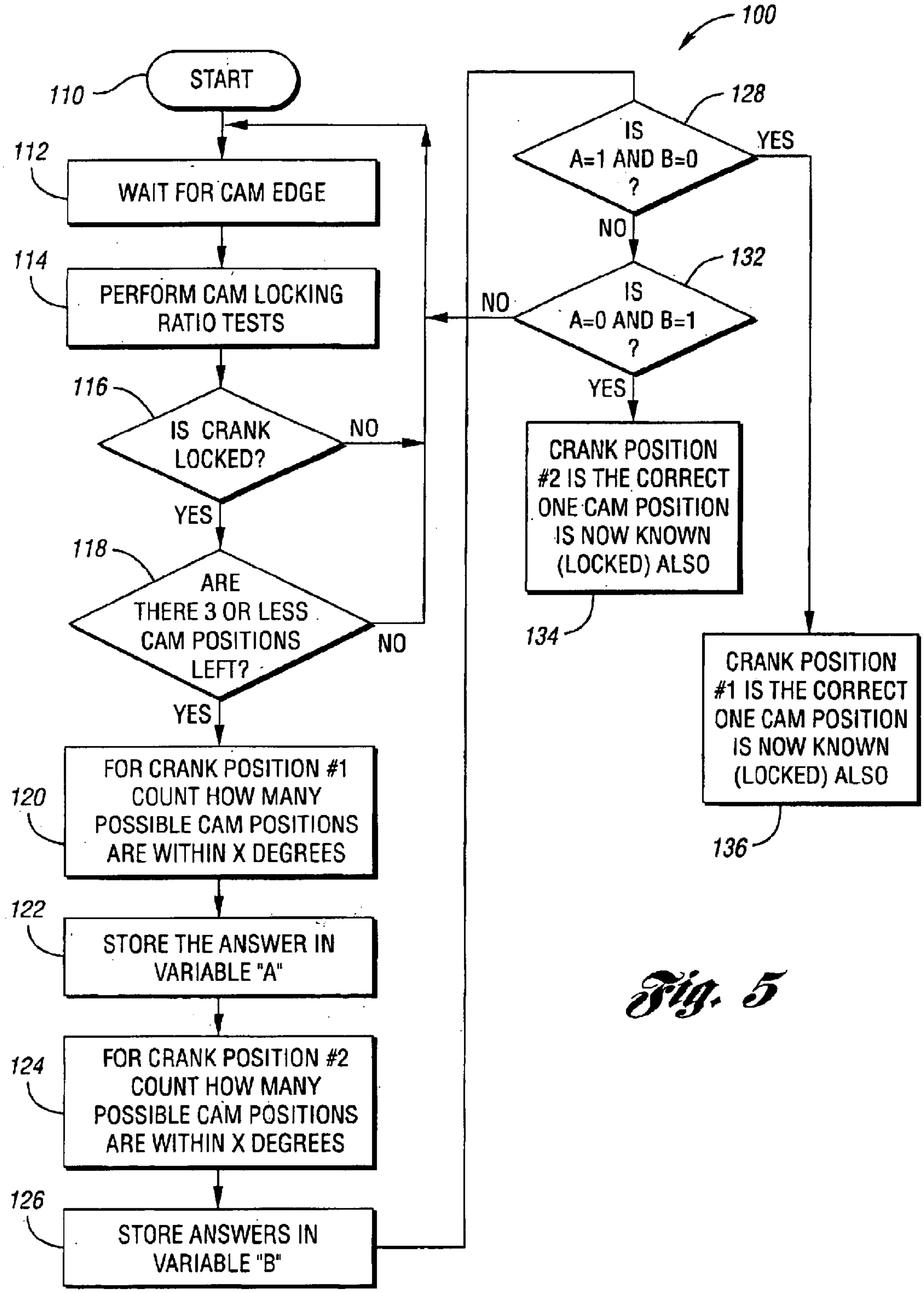
FIG. 5 is a flow chart representation of the fast lock algorithm employed according to a second embodiment of the present invention.
Figure 6:
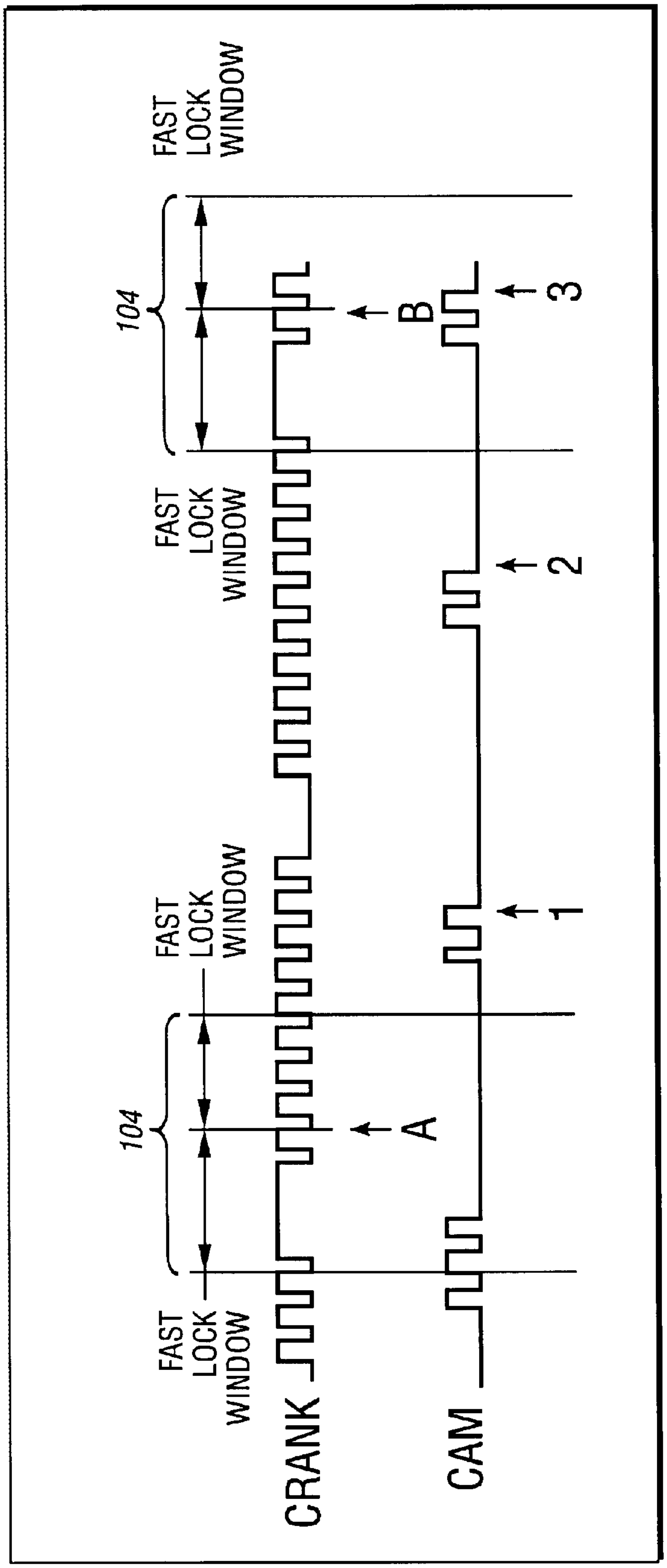
FIG. 6 is an example of the waveform from the cam and crank sensors.

Turning now to FIGS. 5 and 6, the fast lock algorithm 100 will be described. At block 110 the algorithm is started. A cam edge is read at block 112 and the cam locking ratio tests are performed at block 114. At decision block 116 it is determined if the crankshaft 14 is locked. If the crankshaft 14 is not locked, the process returns to block 112. If the crankshaft 14 is locked, the process proceeds to decision block 118. At decision block 118 it is determined if there are 3 or less marked cam positions remaining. If not, the process returns to block 112. If there are 3 or less cam positions remaining, the process proceeds to block 120 wherein for crankshaft 14 position 1, the possible camshaft 14 positions possible within $\chi$ degrees are counted; $\chi$ degrees referring to the width or sample size of the fast lock or reference window 104. The process then proceeds to block 122 wherein the number of possible camshaft 12 positions determined from block 120 is stored as "A". Next, the possible camshaft 12 positions for crankshaft 14 position 2 within $\chi$ degrees are counted at block 124 and the answer is stored as "B" at block 126. The process then proceeds to decision block 128 wherein it is determined if "A" is 1 and "B" is 0. If so, then at block 130 it is determined that crankshaft 14 position 1 is correct and the camshaft 12 position is also known and locked. If not, then at decision block 132 it is determined if "A" is 0 and "B" is 1. If not, the process returns to block 112. If so, then at block 134 it is determined that crankshaft 14 position 2 is the correct one and camshaft 12 position is also known and locked.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for determining an angular position, at startup, of an internal combustion engine having a crankshaft and a camshaft each including a plurality of position indicating teeth, said method comprising the steps of:

determining a crankshaft position by sensing the plurality of position indicating teeth on said crankshaft; and determining a crankshaft phase position, comprising the steps of:

setting a sample size of the engine cycle in each of two concurrent engine cycles;

assigning a predetermined amount of said plurality of teeth of said camshaft as marked teeth;

counting the marked teeth of said plurality of teeth on said camshaft found in said sample sizes; and determining said crankshaft phase position according to the marked teeth appearing in said sample sizes.

2. The method according to claim 1, wherein said predetermined amount of marked teeth is 3.

3. The method according to claim 2, wherein the step of determining the crank position includes the step of identifying a single marked cam tooth within said sample sizes.

4. A method for determining an angular position of an internal combustion engine having a rotating crankshaft and a rotating camshaft each including a plurality of position indicating teeth, said method comprising the steps of:

assigning a portion of a first and second concurrent engine cycle as a first and second reference window;

assigning a predetermined amount of said plurality of teeth as marked teeth;

identifying an amount of said plurality of marked teeth of said rotating camshaft within said first and second reference window; and determining the position of said rotating crankshaft based on the amount of marked teeth identified within said first and second reference windows.

5. The method for determining the position of a rotating crankshaft relative to a rotating camshaft throughout an engine cycle of an internal combustion engine of claim 6, wherein said predetermined amount of marked teeth is 3.

6. The method for determining the position of a rotating crankshaft relative to a rotating camshaft throughout an engine cycle of an internal combustion engine of claim 5, wherein the step of determining the position of said rotating crankshaft includes the step of identifying a single marked tooth of said rotating camshaft in said first and second reference windows.

* * * * *

UNITED STATES PATENT AND TRADEMARK OFFICE

CERTIFICATE OF CORRECTION

PATENT NO. : 6,745,118 B2 
DATED : June 1, 2004
INVENTOR(S) : Bortolin et al.

It is certified that error appears in the above-identified patent and that said Letters Patent is hereby corrected as shown below:

Title page,
Item [*] Notice, delete "bydays.days." and insert -- by 162 days. --

Signed and Sealed this

Twentieth Day of July, 2004

JON W. DUDAS
*Acting Director of the United States Patent and Trademark Office*